Aug. 2, 1949.  A. E. ROANE  2,477,653
PRIMARY ELECTRICAL TRAINING TEST BOARD APPARATUS
Filed Aug. 10, 1943  3 Sheets-Sheet 3
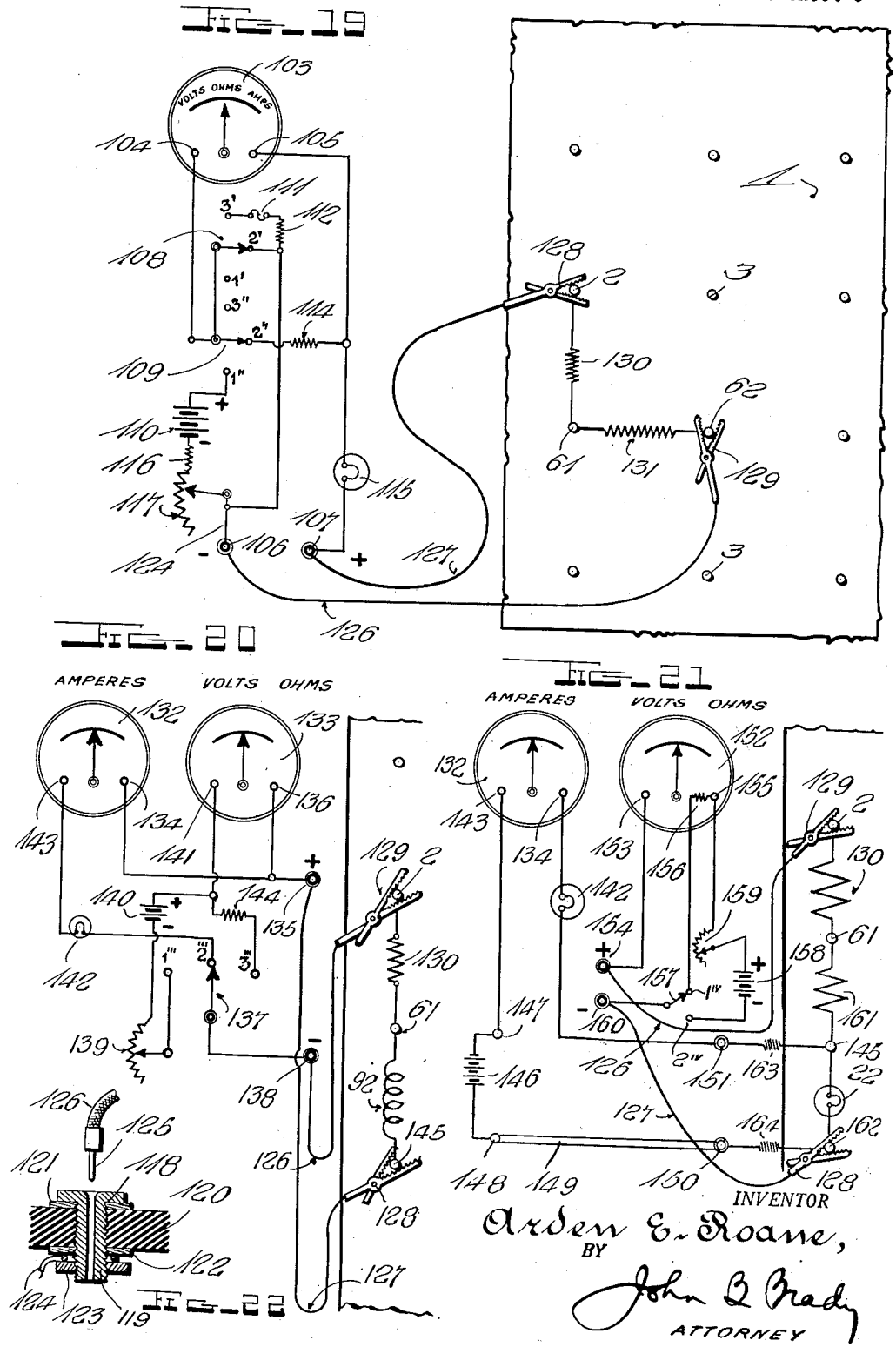

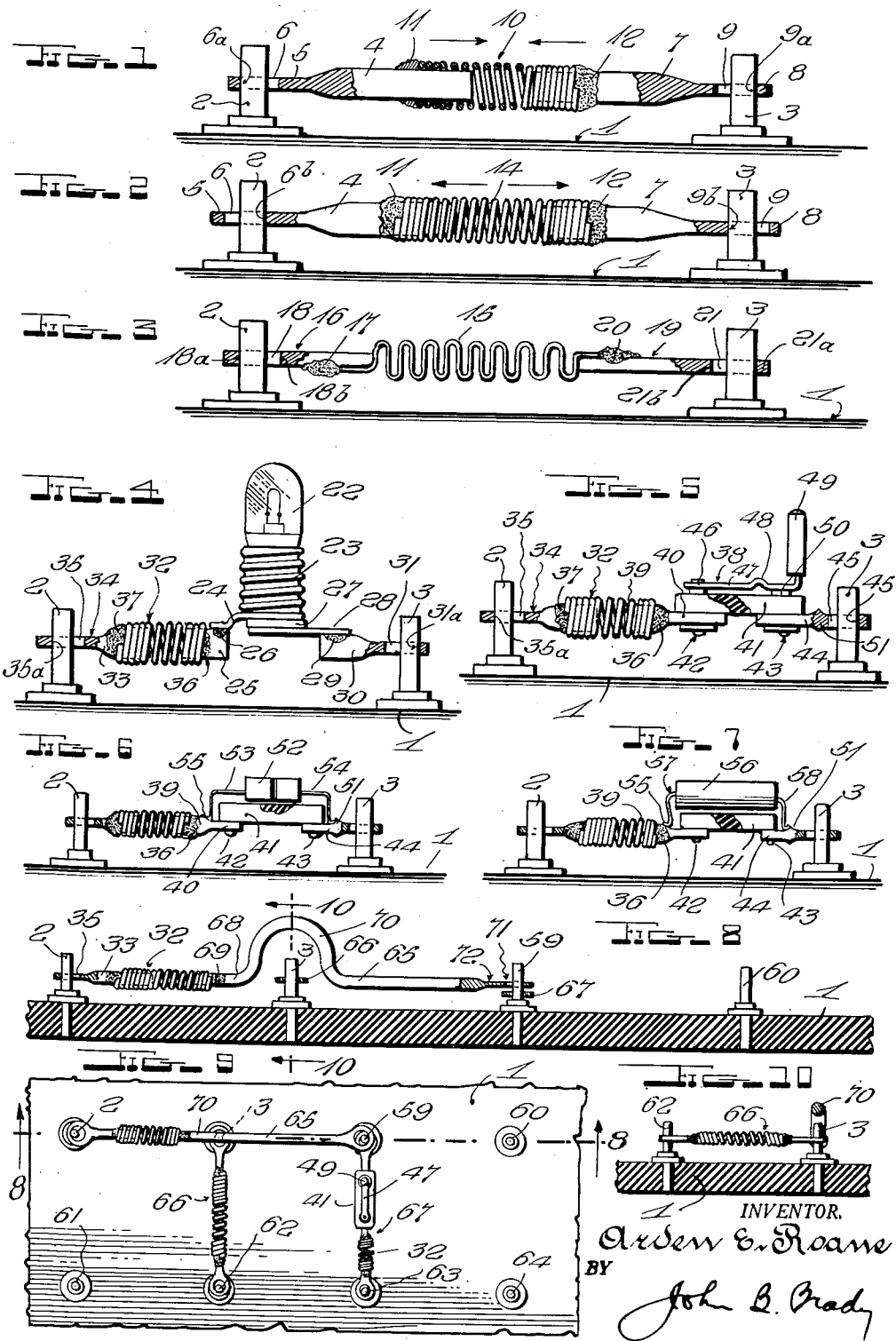

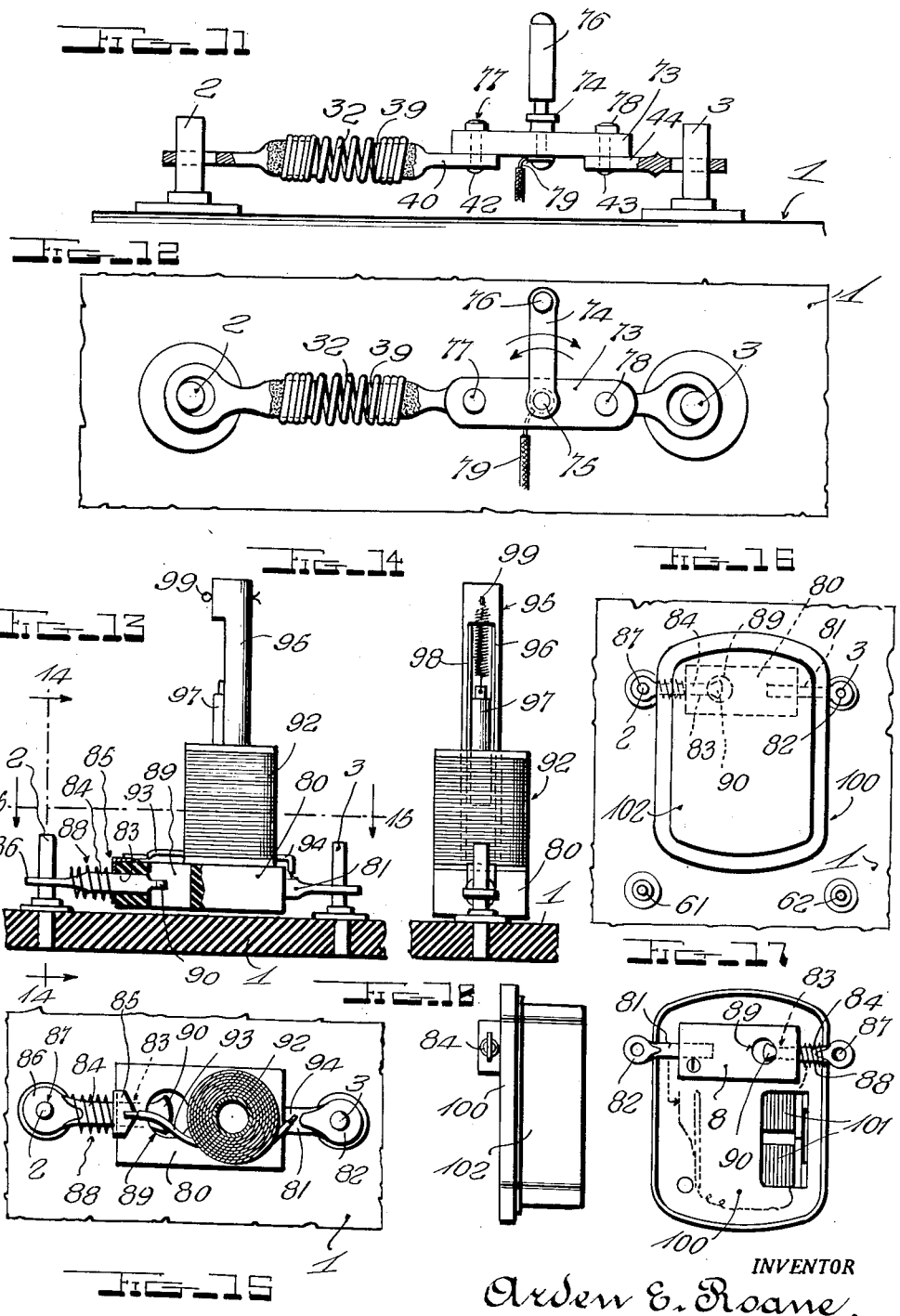

Patented Aug. 2, 1949

2,477,653

UNITED STATES PATENT OFFICE 2,477,653

PRIMARY ELECTRICAL TRAINING TEST BOARD APPARATUS

Arden E. Roane, Hagerstown, Md., assignor to The W. H. Reisner Manufacturing Company, Inc., Hagerstown, Md., a corporation of Maryland Application August 10, 1943, Serial No. 498,118

10 Claims. (Cl. 35—19)

My invention relates broadly to educational apparatus and more particularly to equipment for teaching essentials of the art of electricity and component instrumentalities used in electrical engineering.

One of the objects of my invention is to provide a construction of connecting means for mounting various electrical components on a test board in such a manner that electrical connection for such components may be quickly established or removed and connection of a substitute component reestablished between test terminals.

Another object of my invention is to provide a construction of test apparatus in which the electrical connections may be quickly established in a circuit layout or network and readily replaced by substitute electrical components in the circuit for quick measurement and test.

A still further object of my invention is to provide a construction of expandable or contractible link members for establishing circuit connections between terminal posts of a test board in which the link member is constructed for mounting various forms of electrical components, the effect of which in various circuit permutations and combinations is to be measured and tested.

Still another object of my invention is to provide a construction of a resilient link member and support for electrical components arranged to interchangeably bridge terminal posts of a test board for enabling quick replacement of the electrical component for building up an electrical network system.

Other and further objects of my invention reside in quick detachable and replaceable electrical connectors as set forth more fully in the specification hereinafter following by reference to the accompanying drawings in which:

Figure 1 is a side elevational view of one of the devices of my invention mounted in position on the terminals of a test board with parts of the device broken away and shown in section, the connector being provided with a compression coil spring for insuring good electrical connection between terminal posts; Fig. 2 is a view of a modified construction of connector embodying my invention by employing an expansion coil spring in lieu of the compression coil spring employed in the form of my invention shown in Fig. 1; Fig. 3 is a side elevational view of a further modified form of connector embodying my invention in which a flat strip-like spring member is employed in lieu of the coil springs shown in Figs. 1 and 2, parts of the connector being broken away and illustrated in section; Fig. 4 is a side elevational view showing the connector of my invention serving as a support and mounting means for a test lamp for ready attachment or detachment from the test board; Fig. 5 illustrates the application of the connector of my invention in association with a single throw single pole electric switch; Fig. 6 illustrates my invention applied to the mouting of an electrical resistance element on the test board; Fig. 7 illustrates the application of the connector and mounting means of my invention for the support of an electrical condenser; Fig. 8 illustrates a modified construction of link connector constructed in accordance with my invention, with special provision for bridging intermediate cross links employed on the test board, the view being taken on line 8—8 of Fig. 9; Fig. 9 is a fragmentary plan view of the arrangement shown in Fig. 8; Fig. 10 is a transverse sectional view taken on line 10—10 of Fig. 8; Fig. 11 illustrates the application of the connector of my invention for attachably and detachably mounting a double throw single pole electric switch with respect to the test board; Fig. 12 is a plan view of the construction of switch illustrated in Fig. 11; Fig. 13 is a side elevational view showing a solenoid device supported by the electrical connector of my invention in quick replaceable position on the test board; Fig. 14 is an end view of the solenoid device, looking approximately in the direction of line 14—14 of Fig. 13; Fig. 15 is a transverse sectional view, taken on line 15—15 of Fig. 13; Fig. 16 illustrates in top plan view the connector of my invention applied to the mounting of a buzzer for quick attachment and detachment with respect to the test board; Fig. 17 is a bottom plan view showing the connector of my invention associated with the buzzer of Fig. 16; Fig. 18 is a side elevational view of the electrical connector and buzzer arrangement of my invention; Fig. 19 is a schematic and diagrammatic view of one form of test circuit in which electrical components constructed in accordance with my invention may be arranged; Fig. 20 illustrates a modified arrangement of test circuit utilized in connection with the circuit components of my invention; Fig. 21 shows a further modified form of test circuit employed in association with the electrical components of my invention; and Fig. 22 is a schematic cross-sectional view showing the manner of establishing connection between the test leads which extend to the circuit components of my invention and the test circuit used for purposes of measurement of the various circuit components.

Referring to the drawings in detail, reference character 1 designates the test board, having pin terminals projecting therefrom at spaced intervals. I have represented two of such terminals by reference characters 2 and 3. The electrical connectors, which serve to interconnect the pin terminals, are constructed in such manner that good electrical connection is assured at all times between the pin terminals even though the electrical connection may be very quickly established. The electrical connector shown in Fig. 1 includes a pair of round rod members 4 and 7, each of which have a length substantially less than one-half the distance between the pin terminals. The rod members 4 and 7 each have flattened end portions illustrated at 5 and 8 respectively. The flattened end portions 5 and 8 are each apertured as represented at 6 and 9 respectively, the apertures being of a size enlarged to approximately one and one-half times the diameter of the associated terminal pin 2 or 3. This permits the connector embodying the rod members 4 and 5 to be readily slipped over and removed from the ends of pins 2 and 3. The rod members 4 and 7 are interconnected by means of a compression coil spring illustrated at 10, having a diameter sufficiently large to readily embrace the round rod members 4 and 5 and having a length sufficient to extend over approximately one-quarter of the length of each of the rod members 4 and 7, bridging the gap between the aligned ends of the rod members as shown, while maintaining spacial relation between the convolutions of the coil spring as shown at 10 sufficient to assure continuous tension of the connecting link between the terminal pins. The ends of the compression coil spring 10 are soldered at 11 and 12 to the rod members 4 and 7 providing a good electrical and mechanical connection therewith. The compression coil spring 10 thus tends to draw rod members 4 and 7 toward each other, establishing frictional connection between inner-face 6a of aperture 6 of rod member 4 and inner face 9a of aperture 9 of rod member 7. In applying the connector to pin terminals 2 and 3, the rod members 4 and 7 are stretched apart sufficiently to allow the apertures 6 and 9 to be readily engaged over the pins 2 and 3 and permit the compression coil spring 10 to draw the rod members 4 and 7 toward each other for maintaining frictional contact between faces 6a and 9a and the sides of pins 2 and 3. In removing the connector, the members 4 and 7 are stretched apart sufficiently to release the flattened ends 5 and 8 from engagement with the pins 2 and 3 to allow quick detachment thereof.

In Fig. 2 I have shown a similar construction of electrical connector embodying my invention except that I employ in this form of my invention an expansion coil spring 14 so that the friction contact between the apertured portions 6 and 9 of the connector is established between faces 6b and 9b of the apertures 6 and 9 and the inner faces of pins 2 and 3. In applying this type of connector to the pins 2 and 3, I compress the rod members 4 and 7 toward each other sufficient to slip the apertured ends of the rod members 4 and 7 over the pins 2 and 3 so that face 6b of rod member 4 engages pin terminal 2 and face 9b of rod member 7 engages pin terminal 3. In removing the connector, the same process is employed in that the rod members 4 and 7 are compressed toward each other to release the frictional grip between faces 6b and 9b and pins 2 and 3.

In Fig. 3 I have shown a form of my invention in which a ribbon-like spring 15, formed from a flat, resilient band, bent upon itself in sinusoidal arrangement, is employed in lieu of coil springs illustrated in Figs. 1 and 2. The ribbon-like spring 15 may have its opposite ends soldered at 17 and 20 to the flat lug members 16 and 19. The length of the ribbon-like spring 15 when in operative position is approximately one-half the distance between the pins 2 and 3. The flat lug members are apertured as represented at 18 and 21 to engage the pin terminals 2 and 3. As illustrated the ribbon-like spring 15 is of the compression type and mechanical and electrical connection is established between face 18a of aperture 18 and the side of pin 2 and bottom face 21a of aperture 21 and the side of pin 3. The ribbon-like spring 15 may be of the expansion type in which event frictional engagement would be established between the face 18b of lug 16 and pin 2 and face 21b of lug 19 and pin 3.

In Fig. 4 I have shown the connector of my invention applied as a supporting means for an electric test lamp illustrated at 22. Test lamp 22 is carried by screw threaded socket 23, the shell of which is connected by lug 24 to the short rod member 25 through soldered connection 26. The inner contact of shell 23 passes through insulated plate 27 and connects to strip 28 which is soldered at 29 to rod member 30. Rod member 30 is apertured at 31 to fit over pin 3 and establish electrical and mechanical connection therewith through the face represented at 31a. The short rod member 25 is electrically and mechanically connected through coil spring 32 with the short rod member 33 which terminates in flattened lug 34. The flattened lug 34 is apertured at 35 to fit over pin terminal 2 and establish electrical connection therewith through face 35a. The coil spring 32 is of the compression type connected by solder 36 at one end to the rod member 25 and by solder 37 at the other end with short rod member 33. The short rod members 33 and 25 are spacially related and separated by a gap between the ends thereof which is bridged by the compression coil spring 32 in such manner that convolutions of coil spring 32 are spacially related to maintain the linkage under tension between pins 2 and 3 when the component such as the lamp 22 is mounted in position between the pins 2 and 3. In this arrangement an extension type spring may also be employed and the principles illustrated at Fig. 2 applied to the component mounting shown in Fig. 4.

In Fig. 5 I have shown the manner of mounting a single pole single throw switch 38 with respect to the linkage of my invention. In this arrangement the same resilient linkage comprising coil spring 32 is employed and connected with a short member which corresponds to the short rod member 25 in Fig. 4. The short member in Fig. 5, however, is constituted by a rod member 39 which is flattened at 40 and provides a connection to insulated panel 41 through a rivet or other suitable connecting means 42. The opposite end of the insulated panel member 41 is connected through rivet or other suitable connecting means 43 with the lug member 44. Lug member 44 is apertured at 45 to engage pin terminal 33. The inner face 45a of lug 44 embraces the pin 3 for establishing mechanical and electrical connection therewith. The panel 41 provides a pivotal mounting means at 46 for the switch arm 47 which connects at 42 with flattened portion 40 of rod member 39. The switch arm 47 includes an upstruck portion 48 for imparting resiliency thereto and an operating handle 49 by which the switch arm 47 may be moved into and out of electrical connection with the contact 50. Contact 50 connects through the rivet or other suitable connection 43 with the lug 44. A solder connection indicated generally by the deposit of solder 51 on lug 44 is made through a suitable wire connection with the contact 50. The resilient link when placed in position upon pin terminals 2 and 3 may therefore provide for the quick opening and closing of the electrical circuit through the link by slight angular movement of switch arm 47.

In Fig. 6 I have shown the linkage of my invention applied to the mounting and support of an electrical resistor. In this arrangement an insulated panel 41 is supported between the flat end 40 of lug 39 and the flat end of lug 44 by suitable rivet connections indicated at 42 and 43. Insulated panel 41 serves as a mounting means for the resistor 52 having leads 53 and 54 extending therefrom. Lead 53 is soldered at 55 to rod member 39 while lead 54 is soldered at 51 to lug 44, thus forming a series resistance path through the flexible link interconnecting pin terminals 2 and 3.

In Fig. 7 I have shown an arrangement of resilient link similar to that shown in Fig. 6 except that an electrical condenser 56 is mounted on insulated panel 41 with lead 57 extending from one end and soldered at 55 to rod member 39 and lead 58 extending from the other end thereof and soldered to lug 44 at 51. The resilient link when placed in position between pins 2 and 3 thus includes an electrical condenser in series circuit path.

In Fig. 8 I have shown an extension of the test board I including in addition to pin terminals 2 and 3 the spaced terminals 59, 60, 61, 62, 63 and 64. Various combinations of electrical compenents can be assembled on these pin terminals as represented, for example, by the bridging connector shown at 65 in Fig. 8 and the continuous transverse connector 66 single pole single throw switch connector 67 in Fig. 9. The bridging connector 65 shown in Fig. 8 includes a rod portion 33 arranged similarly to the correspondingly numbered rod portion explained in Figs. 4–7 engageable through aperture 35 with pin member 2, and connected through coil spring 32 with the aligned end 68 of the bridging connector 65. A solder connection indicated at 69 is established between the aligned end 68 of bridging connector 65 and coil spring 32 as indicated. A loop 70 formed in bridging connector 65 extends over the transverse connector 66 as shown in Fig. 8 and connects with pin terminal 59. Aperture 71 in the flattened end 72 of bridging connector 65 fits over pin 59 and forms an electrical connection therewith. Fig. 8 illustrates in end section the transverse linkages 66 and 67 shown in plan view in Fig. 9. It will be observed that by reason of loop 70 of bridging connector 65, connection is made between pin terminals 2 and 59 without connection with transverse linkage shown at 66. The transverse link 67 including single pole single throw switch 47 provides means for continuing the circuit from bridging connector 65 to terminal pin 63.

In Figs. 11 and 12 I have shown the application of a single pole double throw switch to the replaceable linkage of my invention. In this arrangement the same tensioning means is provided as that in connection with Figs. 4–7 and an insulated panel comparable to panel 41 is provided as represented at 73 somewhat longer than the insulated panel 41. The single pole double throw switch arm 74 is pivoted at 75 on insulated panel 73 and is movable under control of insulated handle 76 to establish contact either with contact 77 or 78 depending upon the direction in which the switch arm is moved. The switch arm 74 pivoted at 75 is connected through flexible conductor 79 which may be extended to any suitable point on the test board and connected through a quick detachable connection with any of the other terminal pins which may form a terminal connection for a network arranged on the test board. Contact 77 connects through suitable rivet or other connector 42 to the lug 40 of the short rod member 39 while contact 78 connects through suitable rivet or other connector 43 with flat lug member 44 in a manner similar to that explained in connection with Figs. 5–7. Thus a circuit may be established in a series path either through pin terminal 2 or pin terminal 3 extending through conductor 79.

In Figs. 13–15 I have shown a form of the connector of my invention applied as a support for a solenoid for the education of the student in studying the operation of a solenoid. An electrical circuit may be laid out on the test board between various pin terminals. An insulated panel 80 is provided from one end of which a lug 81 projects for engaging by means of aperture 82 therein the pin terminal 3. The opposite end of the insulated panel 80 is apertured at 83 for the passage of the slidable lug member 84. A plate member 85 is secured over one edge of the insulated panel 80 and is apertured in a position conforming with the apertured portion 83 of panel 80 to allow passage of rod member 84 through both the plate 85 and aperture 83. The rod member 84 has an enlarged flattened end 86 thereon which is apertured at 87 to engage pin terminal 2 and also serves as an abutment for coil spring 88 which is positioned between the flattened elongated end 86 and the plate 85 at the end of panel 80. The end of rod member 84 passes through the aperture 83 in panel 80 and terminates in the space 89 formed by a transverse aperture through panel 80. Rod member 84 is flattened at its end as shown at 90 forming an obstruction restricting the movement of the rod member 84 out of panel 80 beyond a predetermined distance sufficient for the apertures 82 and 87 in rod members 81 and 84 to be engaged over or removed from pin terminals 2 and 3. Rod member 84 is displaceable longitudinally of panel 80 under control of spring 88 which tends to continuously eject rod member 84. The panel 80 provides a mounting means for vertically arranged solenoid shown at 92, one end of which is electrically connected with the plate member 85 through lead 93 and thus connected through spring 88 with rod member 84 for establishing connection with pin terminal 2 and the other end through lead 94 with the rod member 81 for establishing connection with pin terminal 3. Solenoid 92 is provided with a vertically extending guide member 95 in the form of a tube longitudinally cut away at 96 to allow visual observation of the movement of armature 97 under conditions of energization of solenoid 92. The armature 97 is mounted for vertical movement within the guide formed by tubular member 95 and is suspended by coil spring 98 connected by means such as transverse rivet member 99 to the upper end of the tubular member 95. Thus the student is able to observe the movement of the armature as the solenoid winding 92 is energized in the test circuit from time to time.

In Figs. 16, 17 and 18, I have shown a further electric circuit component consisting of an electric buzzer and method of mounting the same with respect to the terminal posts of the test board. The buzzer is mounted upon a base 100 and is illustrated as including electromagnets 101 for operating the make and break armature system which is housed within the casing 102. On the base of the buzzer I arrange the insulated panel 80 with lug 81 extending from one end thereof and terminating in the flattened eyelet apertured at 82 and provided with the yieldably mounted rod member 84 extending through the aperture 82 in insulated panel 80 and yieldable under control of spring 88 as explained in connection with Figs. 13–15. The flattened end rod member 84 apertured at 87 is engageable with the terminal pins of the test board 1 as represented, for example, by the mounting of the buzzer over the pin terminals 2 and 3 as shown in Fig. 16. The rod member 84 is restricted in its output movement by the enlarged end 90 thereof which is visible through aperture 89 in panel 80. The movement of rod member 84, however, is adequate to allow the buzzer to be readily positioned on the test board with the apertured flattened ends of the rod members 81 and 84 engaged over the pin terminals shown at 2 and 3. It will be realized that other forms of electrical components may be similarly mounted with adjustable contact members associated therewith for engagement with the terminal pins of the test board.

In Fig. 19 I have illustrated one manner in which the electrical connectors and mounting means for electrical components are used in association with a test circuit. The test circuit is shown as including a meter 103 having windings arranged for the precision measurement of volts, ohms and/or amperes with the circuits to the meter extending from binding posts 104, and 105 to an external control circuit from which leads are taken from socket terminals 106 and 107 to test leads which extend to the test board 1. The external control circuit connected with meter 103 includes two control switches, one of which has been indicated at 108 and another of which is shown at 109. Each control switch has three separate positions indicated at 1', 2' and 3' and 1", 2" and 3", respectively. Control switch 108 provides means for selecting a path through contact 2' directly to binding post 106 (negative) or through contact 3', fuse 111 and series resistance 112 to the binding post 104 of meter 103. Switch 109 provides means for establishing a shunt path through contact 2' and resistance 114 or a series path through contact 1" and the potential source 110 of, for example 4½ volts, from binding post 104 of meter 103. A 2½ ampere test lamp 115 is provided in circuit with binding post 105 of meter 103 and binding post 107 (positive) leading to the test circuit. Intermediate the binding post 106 and binding post 104, of meter 103, I provide the potential source 110, regulating resistance 116 and the adjustable resistance 117. The meter 103 is normally calibrated over a range of 0–300 milliamperes.

With switches 108 and 109 on contacts 1' and 1" respectively, the circuit is available for measuring resistance in ohms over a range of 0–20,000 ohms.

With switches 108 and 109 in positions 2' and 2", the circuit is in condition to measure current in amperes over a range of 0–2 amperes.

With switches 108 and 109 in positions 3' and 3", respectively, the circuit is in a condition to measure volts over a range of 0–6 volts. The terminals 106 and 107 are illustrated more clearly in Fig. 22 as comprising a socket-like member 118 having a screw threaded shank 119 which passes through the insulated supporting panel represented at 120 and is secured in position with respect thereto through washer members 121 and 122 and securing nut member 123 which serves as a means for clamping and establishing electrical connection with conductor 124 leading to the meter circuit. The socket member 118 is longitudinally split for rendering the socket sufficiently resilient to receive and grip the terminal tip 125 of the test lead 126. A similar terminal test lead is provided in association with binding post 107 as represented at 127. The test leads 126 and 127 are flexible and have a sufficient length to permit the test leads to reach all positions on the test board 1 and to allow the alligator-like terminal gripping means represented at 128 and 129 to engage the terminal posts in any desired position throughout the test board. This permits an electrical network representing various electrical problems to be set up on the test board and measurements made of the circuit characteristics through such electrical components as are arranged on the test board. In Fig. 19, for example, I have shown two link connectors constituted by electrical resistance of different values represented at 130 and 131 connected between terminal pins 2, 61 and 62 as shown. The circuit measurements are made in the particular example illustrated between terminal post 2 and 62 with resistances 130 and 131 in series.

Various problems may be set up on the test board as represented for example, in Figs. 20 and 21, and measurements of the characteristics of the test circuits made. In Fig. 20 an ammeter having a scale deflection of 0–1 ampere is represented at 132 with an associated volt-ohmmeter indicated at 133 calibrated to read 0–6 volts and 0–150 ohms. Terminal 134 of the ammeter 132 is connected directly to socket terminal 135 (positive). Terminal 136 of the volt-ohmmeter 133 is also connected to socket terminal 135. A selector switch 137 is provided having positions 1''', 2''' and 3''' for selectively connecting the meters in the test circuit. Switch 137 is connected to socket terminal 138 (negative) as shown. When switch 137 is in position 1''', a circuit is completed to the volt-ohmmeter through an adjustable rheostat 139 and potential source 140 (1½ volts) to terminal 141 of volt-ohmmeter 133. When switch 137 is in position 2''' a circuit is completed through the 2½ ampere pilot lamp 142 with terminal 143 of ammeter 142. When switch 137 is moved to position 3''' a series resistance 144 is connected in series with terminal 141 of volt-ohmmeter 133. Thus current voltage and resistance may be measured by applying the test leads 126 and 127 carrying connectors 129 and 128 thereon to selected terminal pins of the test board between which components of the test circuit are arranged as represented, for example, by resistance 130 connected between terminal pins 2 and 61 and inductance 92 representative of solenoid winding 92 of the device represented in Figs. 13–15, connected to the pin terminals 61 and 145. Thus various networks may be set up on the test board and measurements taken of different portions thereof by means of the meter circuit shown.

In Fig. 21 I have shown an arrangement of measuring circuit in which the ammeter remains continuously in the test circuit. I have shown the ammeter 132 with terminal 143 thereof connected to an auxiliary circuit which is supplied with current from source of potential 146 connected between terminals 147 and 148. Terminal 148 connects to bus bar 149 terminating in socket terminal 150. Terminal 134 of ammeter 132 connects through 2½ ampere test lamp 142 with socket terminal 151. The volt-ohmmeter is a combination instrument represented at 152 having terminal 153 connected with the socket terminal 154 (positive). Terminal 155 of meter 152 is connected through series resistance 156 with contact 1$^{IV}$ of switch 157 while contact 2$^{IV}$ connects through battery source 158 and adjustable rheostat 159 directly to terminal 155 of meter 152. Switch system 157 connects to socket terminal 160 (negative). The terminal pins insertable into the socket terminals and connected through the flexible test leads 126 and 127 may be plugged into the pair of socket terminals 160 and 154 for enabling the connectors 128 and 129 to be engaged upon pin terminals on the test board for the measurement of any selected network as represented, for example, by resistor 130 between pin terminals 2 and 61, resistor 161 between pin terminals 61 and 145, and test lamp 22 between pin terminals 145 and 162. The test prods may be connected to various parts of a test network and measurements taken on the meters when the pin connections are inserted in the socket terminals 154 and 160 of the measuring system. Resilient link connectors 163 and 164 interconnect the power source 146 with the network on the test board.

While I have explained my invention in certain of its preferred embodiments, I desire that it be understood that no limitations are intended upon my invention and that modifications and changes may be made in carrying out details of my invention within the scope of the appended claims.

What I claim as new and desire to secure by Letters Patent of the United States is as follows:

1. In an educational apparatus, an insulated test board carrying a multiplicity of projecting studs linearly spaced in two directions, said studs comprising pairs of electrical circuit terminals, connector means attachable to and removable from the circuit terminals, an intermediate connector means, a resilient connection between one of said first mentioned connector means and said intermediate connector means, and an apparatus unit suspended between said intermediate connector means and the other of said first mentioned connector means for establishing a series electrical path through said apparatus unit between said circuit terminals on said test board.

2. In an educational apparatus a test board formed from insulation material and having a plurality of conductive studs distributed in spaced positions over the surface thereof, said studs comprising pairs of electrical circuit terminals, connector means attachable to and detachable from said circuit terminals, an intermediate connector means aligned with the aforesaid connector means, an insulated panel member extending between one end of said intermediate connector means and one of said attachable and detachable connector means, a yieldable connection between the other end of said intermediate connector means and the other of said attachable and detachable connector means, and an apparatus unit carried by said insulated panel member and electrically included in circuit between said circuit terminals for establishing various circuit permutations and combinations on said test board.

3. In an educational apparatus, a test board formed from insulation material having a plurality of conductive studs distributed in spaced positions over the surface thereof, said studs comprising pairs of electrical circuit terminals, connector means attachable to and detachable from said circuit terminals, an intermediate connector means aligned with the aforesaid connector means, a panel of insulation material interposed between one end of one of said connector means and one end of said intermediate connector means, a tensioned connection between the other end of said intermediate connector means and the other of said connector means, and an electrical switch carried by said panel for opening the circuit through said connector while said connector remains in tensioned position between said circuit terminals for establishing various circuit permutations and combinations on said test board.

4. In an educational apparatus, a test board formed from insulation material having a plurality of conductive studs distributed in spaced positions over the surface thereof, said studs comprising pairs of electrical circuit terminals, connector means attachable to and detachable from said circuit terminals, an intermediate connector means aligned with the aforesaid connector means, a panel of insulation material interposed between one end of one of said connector means and one end of said intermediate connector means, an expansive connection between the other end of said intermediate connector means and the other of said connector means, and an electrical switch carried by said panel for opening the circuit through said connector while said connector remains in fixed mechanical position between said circuit terminals for establishing various circuit permutations and combinations on said test board.

5. In an educational apparatus, a test board formed from insulation material having a plurality of conductive studs distributed in spaced positions over the surface thereof, said studs comprising pairs of spacially related electrical circuit terminals, connector means attachable to and disconnectible from said circuit terminals, said connector means each having a length less than one-half the distance between said circuit terminals, and a coil spring interconnecting the adjacent ends of said connector means and stretchable between the adjacent ends thereof, said coil spring tending to maintain said connector means in mechanical and electrical engagement with said circuit terminals for maintaining a continuous electrical path through said connector means for establishing various circuit permutations and combinations on said test board.

6. In an educational apparatus, a test board formed from insulation material having a plurality of conductive studs distributed in spaced positions over the surface thereof, said studs comprising pairs of electrical circuit terminals, connector means attachable to and detachable from said circuit terminals, an intermediate connector means aligned with the aforesaid connector means, a panel of insulation material interposed between one end of one of said connector means and one end of said intermediate connector means, an expansive connection between the other end of said intermediate connector means and the other of said connector means, a double throw electrical switch carried by said panel for selectively modifying the circuit through said connector while said connector remains in fixed mechanical position between said circuit terminals to provide an electrical path through one or the other of said circuit terminals for establishing various circuit permutations and combinations on said test board.

7. An electrical instruction board formed from insulation material and having a multiplicity of spacially related electrical terminals thereon, and electrical connectors for longitudinally and transversely interconnecting said electrical terminals, each of said connectors having yieldable means for tensioning the connectors between said terminals, one of said connectors having a loop therein for displacing the said connector out of the path of the other connector and maintaining the connectors in spacial relation with respect to each other for establishing various circuit permutations and combinations on said instruction board.

8. In an educational apparatus, a test board formed from insulation material and having a plurality of conductive studs distributed in spaced positions over the surface thereof, said studs comprising pairs of electrical circuit terminals, an insulated panel member having a length substantially less than the distance between said circuit terminals, a lug member extending from one end of said insulated panel member and attachable and detachable with respect to one of said electrical circuit terminals, a lug yieldably projectible from the opposite end of said insulated panel and attachable to and detachable from the other of said electrical circuit terminals, an apparatus unit carried by said insulated panel, and electrical connections between said apparatus unit and each of said lug members whereby said apparatus unit is electrically connected with said circuit terminals and maintained in tensioned connection therewith for establishing various circuit permutations and combinations on said test board.

9. In an educational apparatus, a test board formed from insulation material having a plurality of conductive studs distributed in spaced positions over the surface thereof, said studs comprising pairs of electrical circuit terminals, an insulated panel member having a length substantially less than the distance between said circuit terminals, a lug member extending from one end of said insulated panel member and attachable and detachable with respect to one of said electrical circuit terminals, a lug yieldably projectible from the opposite end of said insulated panel and attachable to and detachable from the other of said electrical circuit terminals, a solenoid mounted on said insulated panel with its axis extending substantially normal to the plane of said panel, an armature member reciprocative by said solenoid, and electrical connections between opposite ends of said solenoid and said lug members whereby said solenoid is electrically connected with said circuit terminals and maintained in tensioned electrical connection therewith for establishing various circuit permutations and combinations on said test board.

10. Electrical apparatus comprising a substantially planar base of nonconducting material; a series of studs of conducting material affixed to said base in equally spaced parallel rows, the distance between studs in a row being the same as the distance between rows, and said studs projecting from said base at right angles; a series of conductors connecting certain of said studs to form an electrical circuit, each said conductor comprising a substantially rigid but extensible element having an eyelet at each end and of such length that it must be slightly stretched in order to slip the eyelets over a pair of said adjacent studs and make a good electrical contact therewith; said studs being of sufficient height to accommodate several of said eyelets, and means for connecting said circuit to a source of electrical energy.

ARDEN E. ROANE.

REFERENCES CITED

The following references are of record in the file of this patent:

UNITED STATES PATENTS

| Number | Name | Date |
|---|---|---|
| 441,130 | Brewer | Nov. 25, 1890 |
| 782,311 | Zalinski | Feb. 14, 1905 |
| 1,073,670 | Ford | Sept. 23, 1912 |
| 1,690,118 | Julyan | Nov. 6, 1928 |
| 1,769,536 | Oak | July 1, 1930 |

FOREIGN PATENTS

| Number | Country | Date |
|---|---|---|
| 179,081 | Great Britain | 1922 |
| 202,983 | Great Britain | 1924 |